(No Model.)
D. W. DODSON.
MECHANICAL MOVEMENT.
No. 306,678. Patented Oct. 14, 1884.
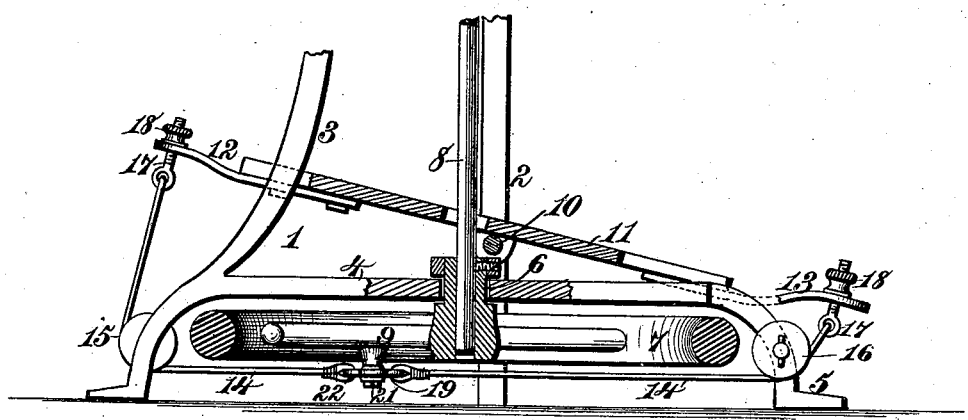
Fig. 1.
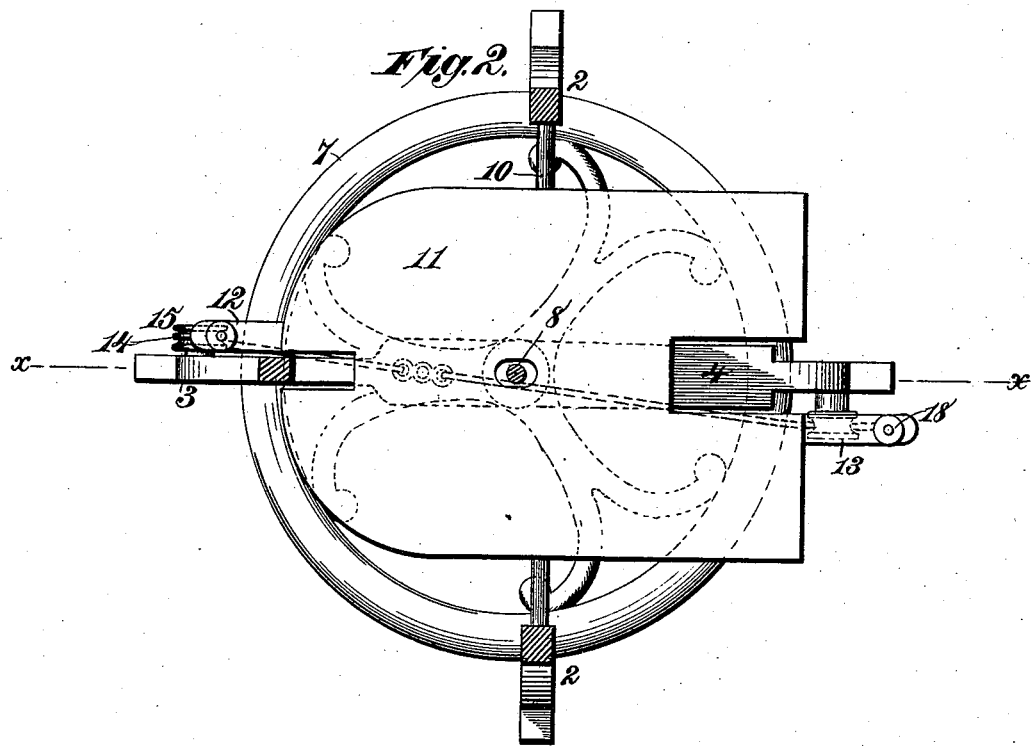
Fig. 2.
Fig. 3.
Witnesses.
Inventor.
Darien W. Dodson,
By James L. Norris,
Atty.

United States Patent Office.

DARIEN W. DODSON, OF TOWN LINE, PENNSYLVANIA.

MECHANICAL MOVEMENT.

SPECIFICATION forming part of Letters Patent No. 306,678, dated October 14, 1884.

Application filed April 3, 1884. (No model.)

*To all whom it may concern:*

Be it known that I, DARIEN W. DODSON, a citizen of the United States, residing at Town Line, Luzerne county, Pennsylvania, have invented new and useful Improvements in Mechanical Movements, of which the following is a specification.

My invention relates to apparatus whereby reciprocating motion is converted into continuous rotary motion, and has for its purpose to provide a simple and efficient mechanism in which a vertical treadle movement may impart rotation to a vertical shaft.

To this end my invention consists in a treadle rocking upon a suitable horizontal bearing, and provided with a forwardly and rearwardly projecting arm, a fly-wheel having a horizontal plane of rotation and provided with a crank-pin, and flexible connections or cords connecting said pin with the arms of the treadle, and cords traveling upon friction-pulleys mounted upon the frame, a vertical shaft being splined into the axis of the wheel.

Referring to the drawings, Figure 1 is a central vertical section taken from front to rear. Fig. 2 is a horizontal section taken in a plane a little above the treadle. Fig. 3 is a detail view of the flexible connection between the treadle and the crank-pin of the rotating fly-wheel.

In the said drawings, the reference-number 1 indicates the frame of the mechanism upon which the operative parts have support. For the convenience of the operator this frame may be provided with three legs, of which two—viz., 2 2—are placed opposite each other, and a third, 3, intermediate thereof. Upon the lower portion of this frame is formed or mounted a horizontal plate, 4, which is extended toward the front of the machine, and provided with a foot-piece, 5, which rests upon the floor, giving a fourth point of support opposite the leg 3. At or about the central point of this plate is formed an aperture to receive the journal 6 of a fly-wheel, 7, having horizontal arrangement underneath, and provided with a vertical shaft, 8, upon which the wheel is keyed in any suitable manner.. Upon the lower face of the fly-wheel is placed a crank-pin, 9.

Above the plate 4, and mounted upon the opposite legs, 2 2, is a horizontal bearing or shaft, 10, upon which is mounted a treadle, 11, extending about equally upon each side of said shaft. Upon each end of this treadle is attached a front and rear arm, 12 and 13, respectively, each having an aperture in its extremity to receive the end of a cord, 14, or a similar flexible connection. (Shown in detail in Fig. 3.) From these arms the said cord runs over a pulley, 15, mounted upon the leg 3, and a similar pulley, 16, upon the support 5, and thence to the crank-pin 9 upon the wheel.

A convenient means of attachment of the cord is that shown in the drawings, though I do not limit my invention thereto. It consists, essentially, of a threaded pin, 17, having an eye to receive the end of the cord, the pin being passed up through the opening in the arm of the treadle and held by a thumb-nut, 18, screwed thereon. At its other end the cord is connected with a plate, 19, having a central opening, 20, which receives the end of the crank-pin 9, being held thereon by a screw, 21, and having an eye, 22, upon each side of the central opening, to receive the cord. By adjusting the thumb-nuts 18 the tension of the cord can be regulated exactly in accordance with the requirements of the machine.

The operation is as follows: As the treadle is rocked upon its shaft 10, tension is given one of the cords 14, thereby drawing upon the crank-pin and rotating the wheel. The moment the crank-pin passes the dead-point the action of the treadle reverses, and the opposite cord is brought into action, thereby giving a continuous rotation to the wheel and its vertical shaft. This motion will be very uniform, for the reason that the treadle acts upon the wheel upon each side of the two dead-centers, and with substantially the same degree of power.

This invention provides a simple, light, and comparatively inexpensive motor for small machines or apparatus requiring a low power.

What I claim is—

1. In an apparatus for converting reciprocating into continuous rotary motion, the combination, with a treadle rocking upon a shaft, of a flexible connection attached thereto, and to a crank-pin upon the shaft, and a friction-bearing for said cord intermediate of the pin and the treadle, substantially as described.

2. In an apparatus for converting reciprocating into rotary motion, the combination, with a treadle rocking upon a shaft, of a fly-wheel having a vertical axis, flexible connections attached to each end of the treadle and to the crank-pin of the wheel, and a friction-pulley beneath each end of the treadle, over which said flexible connections pass, substantially as described.

3. In an apparatus for converting reciprocating into rotary motion, a flexible cord attached to the crank-pin of a wheel having a vertical axis, said cord having threaded pins or bolts upon its ends to receive thumb-nuts resting upon the treadle, whereby the tension of the cord may be adjusted, substantially as described.

4. The combination, with the treadle 11, of the arms 12 and 13, the cord 14, friction-pulleys 15 and 16, and the wheel 7, having a crank-pin, 9, substantially as described.

5. The combination, with the rocking treadle 11, having arms 12 and 13, of the cord 14, having threaded pins 17 and thumb-nuts 18, substantially as described.

6. The combination, with the treadle 11 and the fly-wheel 7, of the flexible cord 14, having the central plate, 19, having an aperture, 20, and eyes 22 upon each side thereof, substantially as described.

7. In an apparatus for converting reciprocating into rotary motion, a frame consisting of the opposite legs, 2 2, an intermediate leg, 3, and a horizontal supporting-plate springing from the latter and having a foot-piece, 5, substantially as described.

In testimony whereof I have affixed my signature in presence of two witnesses.

DARIEN W. DODSON.

Witnesses:
D. L. RHONE,
E. A. LYNCH.